(12) United States Patent
Toon et al.

(10) Patent No.: US 7,117,679 B2
(45) Date of Patent: Oct. 10, 2006

(54) FUEL INJECTION

(75) Inventors: Ian J Toon, Leicester (GB); Gary Eadon, Hinckley (GB); Andrew C Graham, Coventry (GB); Allan J Salt, Nuneaton (GB)

(73) Assignee: Rolls-Royce plc, London (GB)

( * ) Notice: Subject to any disclaimer, the term of this patent is extended or adjusted under 35 U.S.C. 154(b) by 13 days.

(21) Appl. No.: 10/912,071

(22) Filed: Aug. 6, 2004

(65) Prior Publication Data

US 2005/0028525 A1 Feb. 10, 2005

(30) Foreign Application Priority Data

Aug. 8, 2003 (GB) ................ 0318605.3

(51) Int. Cl.
*F02C 1/00* (2006.01)
*F02G 3/00* (2006.01)

(52) U.S. Cl. .......................... 60/740; 60/742

(58) Field of Classification Search ............ 60/39.463, 60/740, 737, 742, 743
See application file for complete search history.

(56) References Cited

U.S. PATENT DOCUMENTS

| | | | | |
|---|---|---|---|---|
| 3,763,650 A | * | 10/1973 | Hussey et al. | ............ 60/39.463 |
| 3,777,983 A | * | 12/1973 | Hibbins | ........................ 239/422 |
| 4,342,198 A | * | 8/1982 | Willis | ............................ 60/737 |
| 4,726,192 A | * | 2/1988 | Willis et al. | .................. 60/737 |
| 5,404,711 A | | 4/1995 | Rajput | |
| 5,647,215 A | * | 7/1997 | Sharifi et al. | ................. 60/737 |
| 5,680,766 A | * | 10/1997 | Joshi et al. | .................. 60/746 |
| 5,816,049 A | | 10/1998 | Joshi | |
| 6,068,470 A | | 5/2000 | Zarzalis | |
| 6,141,967 A | * | 11/2000 | Angel et al. | .................. 60/737 |
| 6,397,602 B1 | * | 6/2002 | Vandervort et al. | ........... 60/737 |
| 6,434,945 B1 | * | 8/2002 | Mandai et al. | ................ 60/740 |
| 6,880,339 B1 | * | 4/2005 | Modi et al. | ................... 60/737 |
| 6,898,926 B1 | * | 5/2005 | Mancini | ................. 60/39.094 |
| 6,915,636 B1 | * | 7/2005 | Stuttaford et al. | ............ 60/737 |
| 2001/0004827 A1 | * | 6/2001 | Vandervort et al. | ........ 60/39.55 |
| 2004/0035114 A1 | * | 2/2004 | Hayashi et al. | ............... 60/737 |

FOREIGN PATENT DOCUMENTS

WO        WO 98/55800 A        12/1998

* cited by examiner

*Primary Examiner*—William H. Rodriguez
(74) *Attorney, Agent, or Firm*—W. Warren Taltavull; Manelli Denison & Selter PLLC

(57) ABSTRACT

In order to allow dual fuel operation, that is to say gas and liquid fuel, a fuel injection arrangement and an assembly are provided in which an injection conduit provides constriction to an airflow towards an outlet. In an assembly a plurality of arrangements including liquid fuel jets are arranged to such that through high angle incidents by the airflow appropriate vaporization and droplet formation is achieved for a fuel/air mixture combustible in a combustor of a turbine engine. At low liquid fuel flow rates below a pre-determined level the liquid fuel is atomized and entrained by the airflow. At high liquid fuel flow rates the fuel splash impinges upon a wash surface to develop a wash film which is again vaporized and atomized about an edge for a fuel/air mixture capable of combustion.

22 Claims, 4 Drawing Sheets

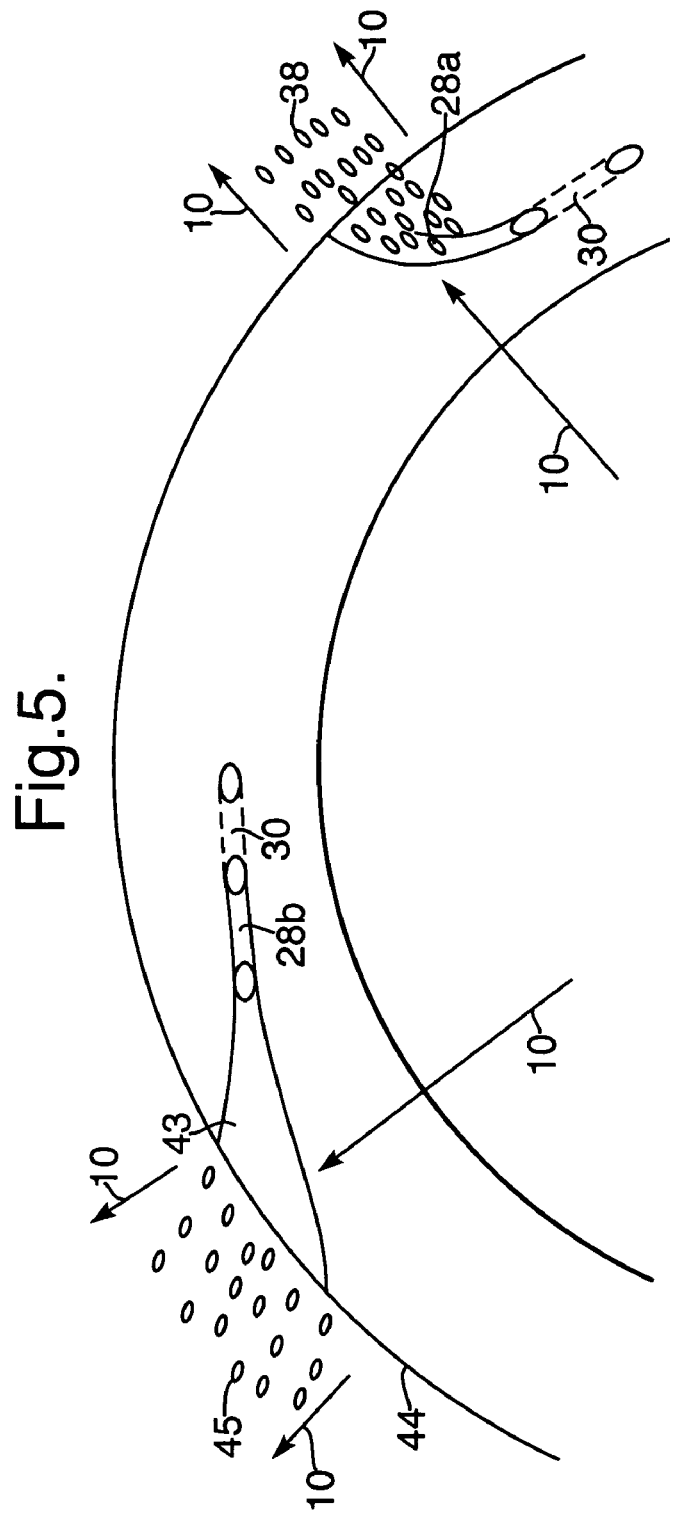

FUEL INJECTION

FIELD OF THE INVENTION

The present invention relates to fuel injection and more particularly to fuel injection arrangements to allow dual fuel combustion in a combustor of a turbine engine.

BACKGROUND OF THE INVENTION

Operation of turbine engines is well known and involves the use of a combustor in order to combust a fuel and therefore provide rotary power for the prime mover engine. Turbine engines are used in a wide variety of situations and the present invention has particular applicability to stationary engines utilised for electrical power generation and providing power for pumping operations etc. It will be understood that turbine engines are utilised in situations such as oil platforms where a local electricity generator and possibly pumping operations are required. In these situations generally natural gas drawn from production will be used in normal operation. However, during construction of the platform and during periods of no gas production the turbine engine must still remain operational at least to provide an electrical power source. Of particular advantage in situations such as oil platforms where there is little space is the high thermal efficiency of turbine engine with low emissions and package size. In such circumstances turbine engines are generally optimized for gas combustion and it is difficult to provide dual fuel operations due to the limited package space available for the fuel injection arrangement as well as costs if intrusive techniques are required to convert between fuels.

SUMMARY OF THE INVENTION

In accordance with the present invention there is provided a fuel injection arrangement for a turbine engine, the arrangement including gas injection means to present gaseous fuel and liquid fuel injection means to present liquid fuel to a combustor, the arrangement characterised in that the liquid fuel injection means incorporates an injection conduit for an airflow and a liquid fuel jet presented at a high angle relative to the air flow such that in use at low fuel injection rates below a predetermined value the air flow entrains and atomises fuel expelled by the fuel jet prior to impingement upon the injection conduit whilst at high fuel injection rates above the predetermined value fuel expelled by the liquid fuel jet impinges upon the injection conduit to form a wash film predictably atomised by the conduit air flow at the conduit exit, so that entrained and/or said atomised liquid fuel being interchangeable with gas fuel presented through the gas fuel injection means.

Preferably, the injection conduit is progressively constrictive towards an outlet in order to approximate a flat flow velocity profile for the air flow across the conduit at the fuel jet. Typically, the constriction reduces conduit area by a factor of two towards the outlet. Typically, the outlet is approximately 1 mm wide whilst the upstream conduit is initially significantly wider.

Preferably, the liquid fuel jet is inclined relative to the injection conduit for greater distance before splash impingement with the conduit.

Preferably, the liquid fuel jet orifice has sharp corners at its outlet to prevent fuel wetting the conduit surface from which the fuel emanates.

Preferably, the injection conduit has an angle of at least fifteen degrees to the fuel jet centreline.

Typically, the fuel jet is injected perpendicular to the airflow direction in the conduit, but may be at a significant upstream or downstream angle to the airflow.

Typically, fuel to air mass flow ratios within the conduit may vary between 0.5 and 1.5 to 1, between idle and full power respectively.

Typically, the liquid fuel jet has a width of 1 mm or less. Generally, the gap between the conduit wall 31 and the component 50 is a continuous annulus.

Typically the wash film develops upon the conduit wall opposite the wall containing the liquid fuel jet orifice creating a thin fuel film. Normally the wash film develops by spread divergence to form a wedge wake extending towards a conduit edge. Typically, the wash film has a thickness of about 30 microns at the conduit edge.

Possibly, the liquid fuel jet configuration is variable in terms of angle and/or displacement distance from the outlet for alteration in predictable atomisation and/or entrainment.

Also in accordance with the present invention there is provided a fuel injection assembly for a turbine engine comprising a plurality of fuel injection arrangements as described above.

Possibly, the assembly includes a plurality of such arrangements distributed about a combustor inlet, such that the wash films of adjacent arrangements extend to present a continuously uniform wash film about the assembly. Generally, the conduit and/or outlet of the assembly is presented relative to a common longitudinal axis of the assembly with an exit angle determined for appropriate fuel distribution into the combustor. Possibly, the fuel and air exit cone angle from the annular conduit is in the range of 90° to 180°.

Further in accordance with the present invention there is provided a turbine engine incorporating a fuel injection arrangement or a fuel injection assembly as described above.

BRIEF DESCRIPTION OF THE DRAWING

An embodiment of the present invention will now be described by way of example and with reference to the accompanying drawings in which:

FIG. 5 is a schematic plan view of half a fuel injection assembly in accordance with the present invention through the conical conduit channel.

DETAILED DESCRIPTION OF THE INVENTION

As indicated above operation of turbine engines is well known. In short, the various stages of a turbine engine operation can be summarised as "suck", "squeeze", "bang" and "blow". The "bang" operation relates to the combustion of the compressed air/fuel in order to create propulsive power. In order to provide combustion it is necessary to appropriately mix airflows with a fuel. This fuel can be a hydrocarbon gas and so as indicated with respect to oil and natural gas production offshore platforms operation of a turbine engine as electricity generator or pump can be achieved by drawing gas from well production. However, during fabrication and construction of the production platform a supply of gas is not available and so operation of the turbine engine generator will require an alternative fuel source. Similarly, engines used for onshore power generation normally use natural gas fuel for omission and economic reasons. The present invention utilises a diesel or kerosene liquid as the alternative fuel. This alternate fuel supply will also be utilised during periods of production platform maintenance and as an emergency backup fuel supply.

Figure 1:
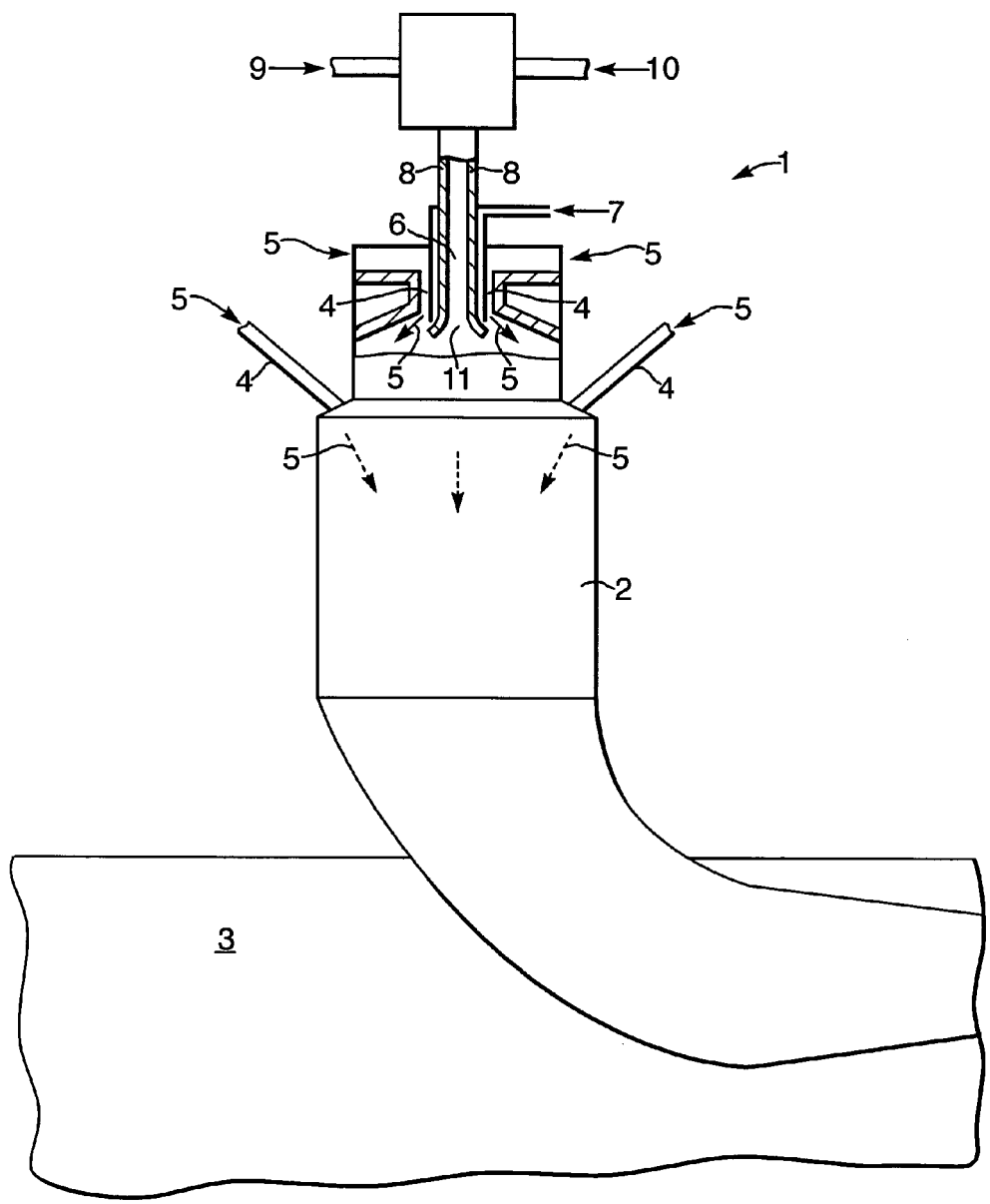
FIG. 1 is a schematic cross section of a combustor assembly associated with a turbine engine in accordance with the present invention.

FIG. 1 provides a schematic cross section of a typical turbine engine combustor arrangement 1. Thus, a combustor 2 is supplied by fuel and air in order to provide propulsive combustion for an engine schematically shown as 3. Air is supplied by combustor inlets 4 in the direction of arrowheads 5 in order to become mixed with a fuel/air mix presented through an injection arrangement 6. This injection arrangement 6 in accordance with the present invention can present a gas fuel in the direction of arrowheads 7 or liquid/diesel fuel through injection conduits 8. The diesel fuel is presented in the direction of arrowhead 9 whilst air for vaporising or atomising that liquid fuel is presented in the direction of arrowhead 10. It will be appreciated that it is important to shatter or vaporise the liquid fuel in order to create droplets appropriate for combustion within the combustor 2. In such circumstances it is important to provide adequate and proportionate liquid fuel and air flow rates and present these two flows at appropriate angles to each other in order to create the desired liquid fuel droplets. The present invention particularly relates to an outlet 11 end part of the fuel injection arrangement 6.

Figure 2:
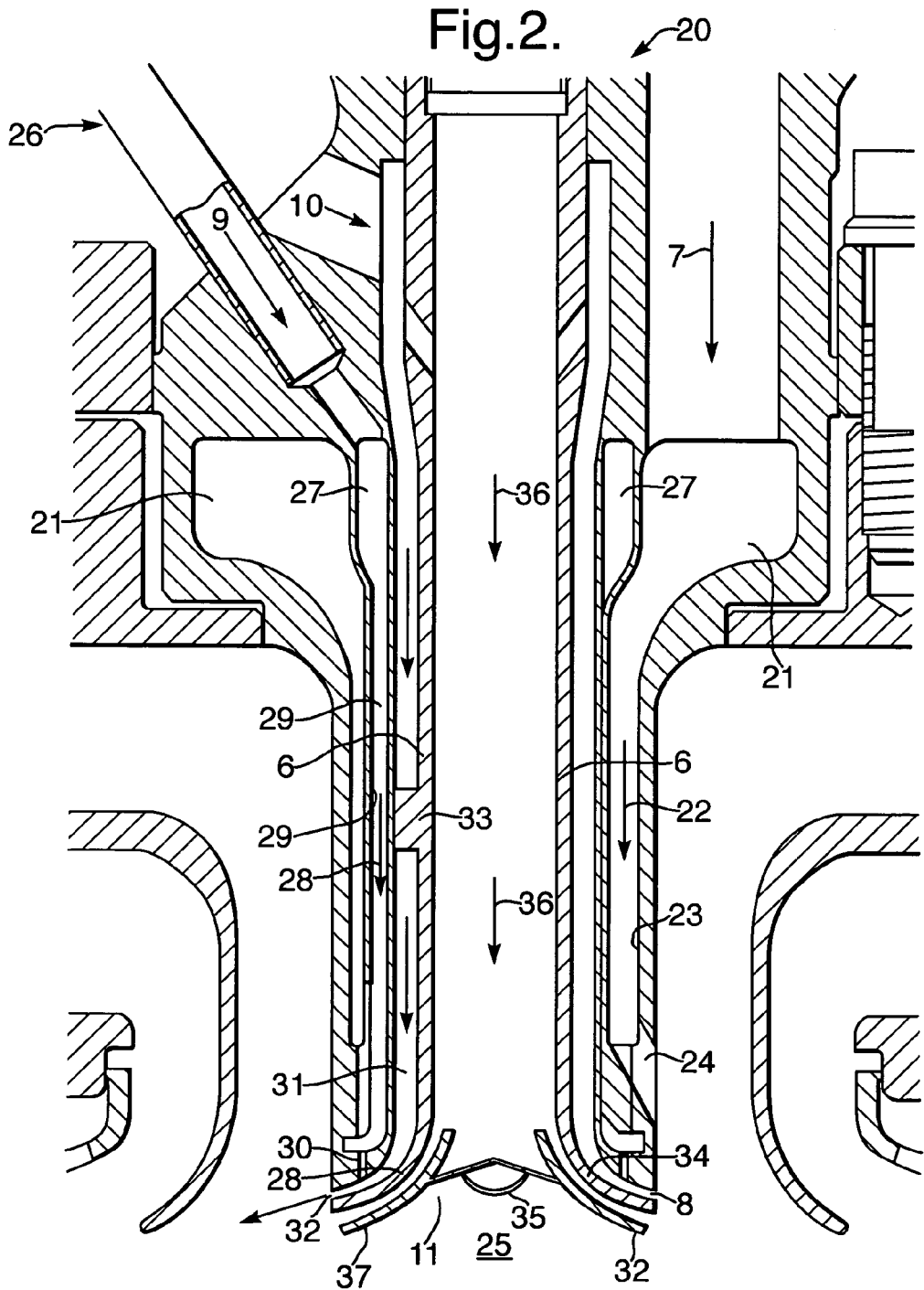
FIG. 2 is a schematic cross section of a fuel injection assembly in accordance with the present invention.

FIG. 2 is a more detailed but still schematic representation of a fuel injection assembly 20 in accordance with the present invention. The assembly 20 includes a number of fuel injection arrangements 30 with respective gas fuel and liquid fuel jets to an output 11 end of the assembly 20.

The gas fuel is presented in the direction of arrowhead 7 through a gas fuel conduit to a gas manifold 21 whereupon the gas fuel passes in the direction of arrowhead 22 through a pathway 23 for presentation through diffusion gas holes 24 into a combustor 25. As indicated previously, this gas fuel is typically provided upon a production platform by appropriate bleed diversion of fuel gas from the production of natural gas or oil. Gas acquired will be used for operation of a turbine engine using a fuel injection assembly in accordance with the present invention. During periods when such gas is not available, a liquid fuel such as diesel or kerosene will be used in order to provide combustion and therefore provide power to the turbine engine generator or prime mover for pump assemblies etc.

Liquid fuel is presented in the direction of arrowhead 9 through a liquid fuel feed tube 26. This liquid fuel congregates in a liquid fuel manifold 27 and subsequently passes in the direction of arrowhead 28 through a pathway 29 to liquid fuel jets 30.

Air for the present fuel injection arrangement passes in the direction of arrowhead 10 through an injection conduit 31 towards an outlet 32 of the arrangements 6. A snubber element 33 is provided in order to ensure appropriate spacing for the conduit 31.

It is by size and configurational relationships between the liquid fuel jets 30 and the airflow 10 through the conduits 31 that appropriate fuel droplets sizes are achieved for combustion, both at low liquid fuel flow rates upon ignition and at a higher liquid fuel flow rates necessary for full load turbine operation. It will also be understood that the manner and presentation of the outlet 32 within the chamber 25 will also be highly determinant with respect to obtaining appropriate mixing of the liquid fuel with air for combustion. In such circumstances, typically as schematically illustrated, bottom peripheral edges of the trumpet-like central core 34 of the assembly will have an angle of about 115° therebetween. However, it will be understood that the particular angle 35 will depend upon the internal aerodynamics of the combustor.

Generally, the core 34 will have a hollow centre through which further air flows in the direction of arrowhead 36 pass. An additional trumpet may be provided to create a high velocity air film across the surface of the main trumpet to prevent carbon deposition on the main trumpet surface. Air is supplied to the slot between the main and additional trumpet from the air conduit through holes in the main trumpet.

Figure 3:
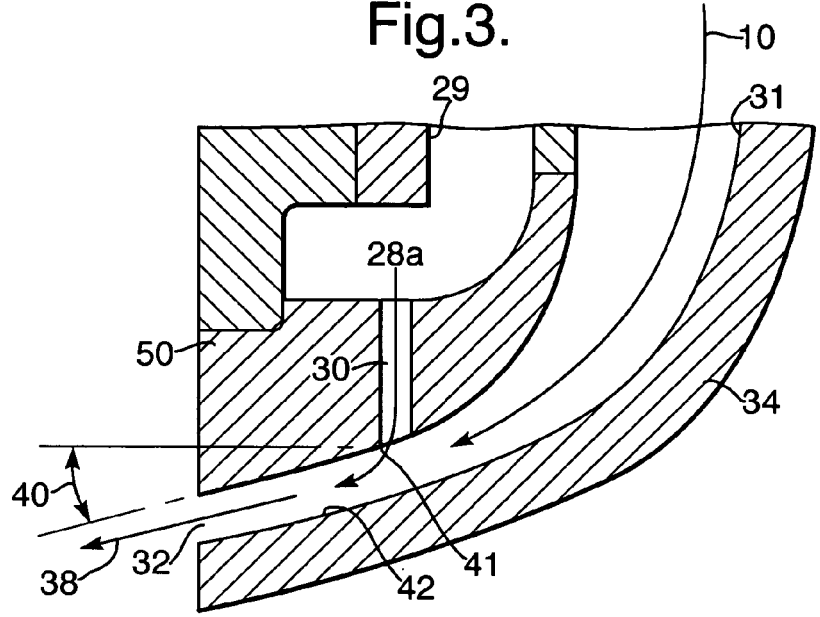
FIG. 3 is a schematic cross section of a fuel injection arrangement in accordance with the present invention during initial ignition or low fuel rate operation, low power operation.
Figure 4:
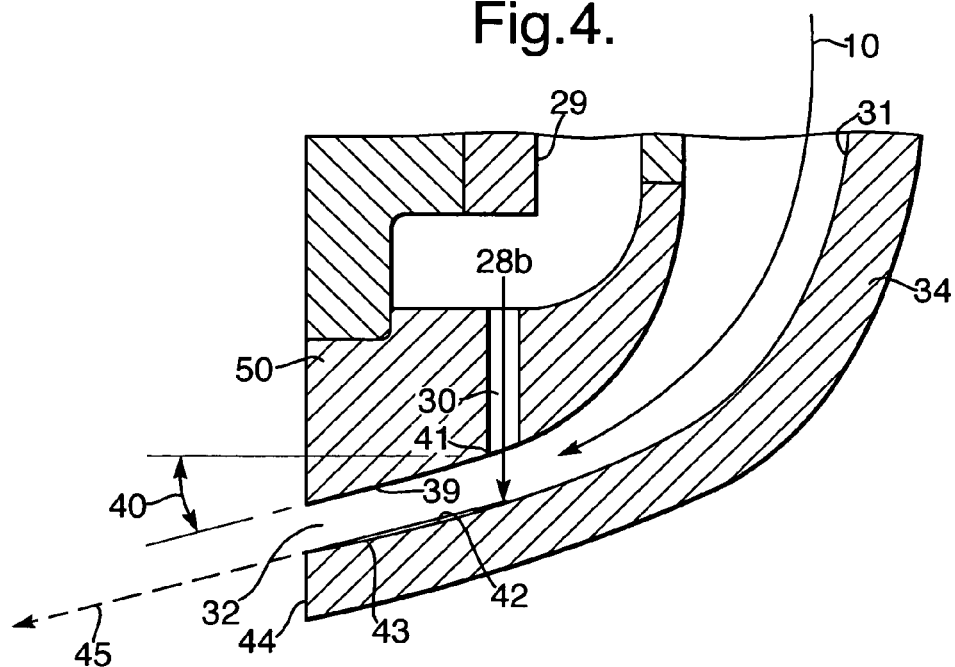
FIG. 4 is a schematic cross section of the arrangement depicted in FIG. 3 at high fuel flow rate operation, high power operation.

FIGS. 3 and 4 schematically illustrate operation of a fuel injection arrangement in accordance with the present invention. FIG. 3 illustrates ignition or low liquid fuel flow rate operation whilst FIG. 4 illustrates higher liquid fuel flow rates up to maximum load including normal steady state operation.

Referring to FIG. 3 it can be seen that the airflow 10 is presented in the injection conduit 31 in the direction of the arrowhead. The injection conduit 31 becomes progressively constricted towards the outlet 32 end of the conduit 31. This constriction is typically at least 1.05:1 and no more than 4:1. The purpose of the constriction is to achieve as near a flat flow pressure profile as possible across the conduit 31 as it is presented to the liquid fuel jet 30. The fuel jet 30 is full of liquid fuel flowing in the direction of arrowhead 28a. In such circumstances, the airflow 10 is presented at a high shear angle and the relatively low liquid fuel flow rate (FIG. 3) is such that the fragmented and shattered liquid fuel is formed into droplets no greater than 80 microns in diameter in a fuel air mixture denoted by arrowhead 38. This fuel air mixture 38 is released into the combustor for combustion in accordance with usual turbine engine operation. In the low fuel or ignition fuel rate operational state depicted in FIG. 3 it is important that the fuel does not remain in contact with an upper surface 39 of the conduit 31. Such wetting will reduce fuel content in the entrained air/fuel mix 38 and create larger droplets when the fuel leaves the conduit surface 39 into the combustor. It will also be understood that the jet edge 41 is rendered sharp to also facilitate detachment of the relatively slow flowing liquid fuel from the jet 30. As will be described later that the fuel jet 30 is also angularly presented to increase the impingement flight length between the end of the jet 30 and a wash surface 42 of the conduit 31. It will be understood that a longer distance to impingement or flight length to the wash surface 42 ensures entrainment of the liquid fuel within the airflow 10 at low fuel flow rates.

Typically, the liquid fuel jet 30 will have a diameter of 0.5 mm in order to achieve the desired fuel droplet creation in the order of less than 80 microns in diameter. However, a significant factor with regard to such fuel jets 30 is the ability to provide jets with accurate dimensions and which will not be susceptible to clogging with wax or particles within the liquid fuel. Hence jets of less than 0.5 mm are undesirable. Generally, the conduit 31 will have an outlet end 32 width dimension in the order of 1 mm across whilst prior to constriction the conduit 31 will have a significantly larger width. In the ignition or low liquid fuel flow operational status shown in FIG. 3 normally to ensure appropriate entrainment and atomisation of fuel droplets the fuel flow rate will be in the order of 0.5 times the airflow rate.

FIG. 4 illustrates a high power operational state for the present fuel injection arrangement 6. Thus, the liquid fuel flow depicted by arrowhead 28b is a high value such that there is impingement of that liquid fuel upon the wash surface 42 of the conduit 31. This liquid fuel impinges and splashes upon the wash surface 42 in order to create a wash film 43. This wash film 43 flows and migrates towards a conduit output edge 44. Because of the relatively high liquid fuel flow rate 28b the air flow has insufficient power in order to fully entrain that flow 28b and create droplets of appropriate size.

Typically, the air flow rate 10 and liquid fuel flow rate 28b are substantially in ratio, that is to say one to one.

The wash film 43 as indicated develops from a splash impingement upon the conduit 31. In such circumstances, the wash film 43 spreads and thins upon the wash surface 42 from that initial splash impingement location towards the edge 44. At the edge 44, the film 43 generally has a thickness in the order of 30 microns. Normally, as indicated previously a fuel injection assembly 20 comprises a number of injection arrangements 6 in accordance with the present invention and the location and positioning of these arrangements 6 is such that the wash films 43 emanating from each arrangement 6 fan out such that there is a substantially consistent film 43 about the peripheral circumference formed by the edge 44 about the trumpet-like core 34. The individual impinging films do not emanate radially outwards on the surface 42, but are directed to be virtually tangential to it, to create a substantially consistent film at the edge 44, and to create a significant convergent angle between the fuel film leaving the conduit edge 44 and the conduit airflow which leaves it radially. In such circumstances, the airflow 10 presented over this edge 44 due to its angle of presentation acts to form liquid fuel droplets in the air flow 10 to create the desired droplet size 45 for combustion.

It will be appreciated that between the lower liquid fuel flow rate 28a and the higher liquid flow rate 28b there is a transition flow range between full fuel entrainment in the airflow 10 and full fuel film 43 shear angle shattering atomisation/vaporisation to create the fuel droplets in the air fuel mix 38, 45 for combustion. In short, in this transition flow range there will be a mixture of entrained fuel and shattered droplet fuel taken from the liquid fuel. There is no problem with operating in the transition region between jet atomisation and film atomisation.

FIG. 5 illustrates a schematic plan view taken through the bottom end of the fuel injection assembly 20 in accordance with the present invention. Thus, jets 30 are presented with liquid fuel flow in the direction of arrowhead 28 and as described previously this liquid fuel flow 28 impinges upon the wash surface 42 in order to develop a wash film 43 which diverges and spreads as it flows towards the edge 44. Airflow 10 is presented below a fuel feed ring 50 in the direction of arrowheads 10. As described previously this airflow 10 acts to shatter the wash film 43 in order to create liquid fuel droplets in the airflow as an air/fuel mix 38, 45 for combustion.

It will be noted that the jets 30 are angled as described previously in order to increase the impingement projection or flight length before impingement upon the splash surface 42. This longer flight length before splash impingement as described previously increases entrainment of liquid fuel droplets below the lower flow rate 28a. In short, the greater flight distance causes greater droplet dispersion and entrainment at low liquid fuel flow rates from the jet 30.

Flow rate 28a is fuel jet after leaving hole 30, the jet is impacted by conduit air 10 and its trajectory gradually changed from across the airflow 10 to parallel to it, being atomised by the air stripping fuel from the surface of the jet. Flow rate 28b is the fuel jet after leaving hole 30, minimal jet trajectory deflection by air 10. Fuel jet impacts conduit wall 42 at a shallow angle forming a wedge film expanding to conduit exit. This thin fuel film is atomised when it leaves conduit end 44 and is entrained by conduit air 10. High flow fuel jets 28b impinge on conduit wall 42 and is atomised when fuel film leaves the conduit wall end 44. Low flow fuel jets 28a are atomised and entrained by air 10.

It will be appreciated that the wash film 43 as indicated above develops from an initial splash impingement on the splash surface 42. In such circumstances the air flow 10 as indicated is at a high angle relative to the film 43 as a wake from the liquid fuel projected from the jets 30. This cross flow to the films 43 greatly facilitates fuel droplet creation above the splash surface 42 both at low fuel flow rate 28a for entrainment as well as by droplet shatter atomisation from the films 43 at higher fuel flow rates 28b.

It will be appreciated that the launch position of the end of the jets 30 may be varied along with the angle of these jets 30 in order to alter both the impingement flight length to splash impingement on the splash surface 42 as well as the development length for the wash film 43 to the edge 44 dependent upon a number of factors including fuel type, temperature and desire to create liquid fuel droplets of different sizes for incorporation in the fuel/air mix 38, 45 to be combusted. Generally, the specific angles, lengths and configurations within the overall arrangement and assembly of the present invention will be determined by particular operational requirements for a turbine engine. Normally, upwards of twenty arrangements 6 in accordance with the present invention will be associated in the assembly 20 for a combustor of a turbine engine.

A particular advantage with regard to the present fuel injection assembly 20 is that it can be configured principally within the existing package envelope of a gas fuel injector. The present fuel injection assembly is located about its central core 34 of that existing gas fuel injection system. In such circumstances, the present fuel injection assembly can be associated with an existing gas fuel injection system specified for a gas powered turbine engine without radical redesign other than with regard to supply of the liquid fuel and airflows for entrainment and wash film action.

Normally it will be appreciated that gas fuel and liquid fuel can be supplied at the same time through the present fuel injection system/assembly as required. However, normally the turbine engine will operate upon a gas fuel supply drawn from a natural gas or oil production platform pumped production or possibly through gas vented from liquid gas storage tanks such as those on board bulk transport ships.

In order to maintain spacings between the inner and outer conduit walls, it will be appreciated that local snubber vanes 33 will be used.

In order to provide further cooling and inhibit smoke soot deposition on to core 34, it will be appreciated that holes may be incorporated into the central core 34 which allow air to be drawn off from the conduit 31. This drawn off air will then swirl around the inner core 34 to provide an air film that prevents smoke soot from contacting core 34.

At the low fuel flow rate 28a during starting and low power operation, depicted in FIG. 3 it will be understood that the fuel jets 30 essentially provide atomised fuel droplets when impacted by the high velocity airflow 30 at a large angle to the fuel jet initial trajectory determined by angular presentation of the jets 30. As indicated generally there is a constriction in the conduit 13 in order that there is a uniform air flow velocity profile and airflow is maximized compared to combustor pressure drop in the plane of the fuel jets. At full power, that is to say with fuel splash impingement on the splash surface 42, atomisation of the liquid fuel is achieved by high velocity thin film break up as it leaves the outlet 32. The wash film 43 is created by angular impingement of the liquid fuel from the jets 30.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A fuel injection arrangement for a turbine engine, the arrangement including gas fuel injection means to present gaseous fuel and liquid fuel injection means to present liquid fuel to a combustor, the arrangement characterised in that the liquid fuel injection means incorporates an injection conduit for an airflow and a liquid fuel jet presented at a high angle relative to the air flow such that at low fuel injection rates the air flow entrains and atomises the liquid fuel expelled by the liquid fuel jet without impingement upon the injection conduit whilst at high fuel injection rates the liquid fuel expelled by the liquid fuel jet impinges upon the injection conduit to form a wash film predictably atomised by the air flow, so that entrained and/or said atomised liquid fuel is interchangeable with gas fuel presented through the gas fuel injection means wherein the injection conduit includes an outlet which is approximately 1 mm wide whilst the injection conduit is significantly wider upstream of said outlet.

2. An arrangement as claimed in claim 1 wherein the injection conduit is progressively constrictive towards an outlet in order to approximate a flat flow velocity profile for the air flow across the conduit at the fuel jet.

3. An arrangement as claimed in claim 2 wherein the constriction reduces conduit area by a factor of typically 2 towards the outlet.

4. An arrangement as claimed in claim 1 wherein the liquid fuel jet is inclined relative to the injection conduit for greater distance before splash impingement with the conduit.

5. An arrangement as claimed in claim 1 wherein the injection conduit has an angle of at least fifteen degrees to the fuel jet centreline.

6. An arrangement as claimed in claim 1 wherein the jets are round or oval or square.

7. An arrangement as claimed in claim 1 wherein the wash film develops upon the injection conduit wall opposite the wall containing jet orifice creating a thin fuel film.

8. A fuel injection assembly for a turbine engine comprising a plurality of fuel injection arrangements as claimed in claim 1.

9. An assembly as claimed in claim 8 wherein the wash films of adjacent arrangements extend to present a uniform wash film about the assembly at the highest fuel flow required.

10. An assembly as claimed in claim 8 wherein the injection conduit and/or injection conduit outlet of the assembly, are presented relative to a common longitudinal axis of the assembly with an exit angle determined for appropriate fuel distribution into the combustor.

11. An assembly as claimed in claim 10 wherein the exit angle is in the range of 90° to 180°.

12. An assembly as claimed in claim 8 wherein the airflow in the arrangements is radial from a common root conduit.

13. An assembly as claimed in claim 8 wherein the assembly is configured with a trumpet outlet periphery incorporating the fuel injection arrangements.

14. A turbine engine incorporating a fuel injection assembly as claimed in claims 8.

15. A turbine engine incorporating a fuel injection arrangement as claimed in claim 1.

16. A fuel injection arrangement for a turbine engine, the arrangement including gas fuel injection means to present gaseous fuel and liquid fuel injection means to present liquid fuel to a combustor, the arrangement characterised in that the liquid fuel injection means incorporates an injection conduit for an airflow and a liquid fuel jet presented at a high angle relative to the air flow such that at low fuel injection rates the air flow entrains and atomises the liquid fuel expelled by the liquid fuel jet without impingement upon the injection conduit whilst at high fuel injection rates the liquid fuel expelled by the liquid fuel jet impinges upon the injection conduit to form a wash film predictably atomised by the air flow, so that entrained and/or said atomised liquid fuel is interchangeable with gas fuel presented through the gas fuel injection means wherein the liquid fuel jet comprises an orifice with sharp corners at its outlet to prevent liquid fuel wetting the conduit surface from which the liquid fuel emanates.

17. A fuel injection arrangement for a turbine engine, the arrangement including gas fuel injection means to present gaseous fuel and liquid fuel injection means to present liquid fuel to a combustor, the arrangement characterised in that the liquid fuel injection means incorporates an injection conduit for an airflow and a liquid fuel jet presented at a high angle relative to the air flow such that at low fuel injection rates the air flow entrains and atomises the liquid fuel expelled by the liquid fuel jet without impingement upon the injection conduit whilst at high fuel injection rates the liquid fuel expelled by the liquid fuel jet impinges upon the injection conduit to form a wash film predictably atomised by the air flow, so that entrained and/or said atomised liquid fuel is interchangeable with gas fuel presented through the gas fuel injection means wherein the liquid fuel to air mass flow ratios within the injection conduit vary between 0.5 and 1.5 to 1 dependant on engine power level.

18. A fuel injection arrangement for a turbine engine, the arrangement including gas fuel injection means to present gaseous fuel and liquid fuel injection means to present liquid fuel to a combustor, the arrangement characterised in that the liquid fuel injection means incorporates an injection conduit for an airflow and a liquid fuel jet presented at a high angle relative to the air flow such that at low fuel injection rates the air flow entrains and atomises the liquid fuel expelled by the liquid fuel jet without impingement upon the injection conduit whilst at high fuel injection rates the liquid fuel expelled by the liquid fuel jet impinges upon the injection conduit to form a wash film predictably atomised by the air flow, so that entrained and/or said atomised liquid fuel is interchangeable with gas fuel presented through the gas fuel injection means wherein the liquid fuel jet has a width of 1 mm or less.

19. A fuel injection arrangement for a turbine engine, the arrangement including gas fuel injection means to present gaseous fuel and liquid fuel injection means to present liquid fuel to a combustor, the arrangement characterised in that the liquid fuel injection means incorporates an injection conduit for an airflow and a liquid fuel jet presented at a high angle relative to the air flow such that at low fuel injection rates the air flow entrains and atomises the liquid fuel expelled by the liquid fuel jet without impingement upon the injection conduit whilst at high fuel injection rates the liquid fuel expelled by the liquid fuel jet impinges upon the injection conduit to form a wash film predictably atomised by the air flow, so that entrained and/or said atomised liquid fuel is interchangeable with gas fuel presented through the gas fuel injection means wherein the liquid fuel injection means includes a liquid fuel manifold and the gap between the injection conduit wall and a portion of said manifold is a continuous annulus.

20. A fuel injection arrangement for a turbine engine, the arrangement including gas fuel injection means to present gaseous fuel and liquid fuel injection means to present liquid fuel to a combustor, the arrangement characterised in that the liquid fuel injection means incorporates an injection conduit for an airflow and a liquid fuel jet presented at a high angle relative to the air flow such that at low fuel injection rates the air flow entrains and atomises the liquid fuel expelled by the liquid fuel jet without impingement upon the injection conduit whilst at high fuel injection rates the liquid fuel expelled by the liquid fuel jet impinges upon the injection conduit to form a wash film predictably atomised by the air flow, so that entrained and/or said atomised liquid fuel is interchangeable with gas fuel presented through the gas fuel injection means wherein the wash film develops by spread divergence to form a wedge wake extending towards a conduit edge.

21. An arrangement as claimed in claim 20 wherein the wash film has a thickness of about 30 microns at the conduit edge.

22. A fuel injection arrangement for a turbine engine, the arrangement including gas fuel injection means to present gaseous fuel and liquid fuel injection means to present liquid fuel to a combustor, the arrangement characterised in that the liquid fuel injection means incorporates an injection conduit including an outlet for an airflow and a liquid fuel jet presented at a high angle relative to the air flow such that at low fuel injection rates the air flow entrains and atomises the liquid fuel expelled by the liquid fuel jet without impingement upon the injection conduit whilst at high fuel injection rates the liquid fuel expelled by the liquid fuel jet impinges upon the injection conduit to form a wash film predictably atomised by the air flow, so that entrained and/or said atomised liquid fuel is interchangeable with gas fuel presented through the gas fuel injection means wherein the liquid fuel jet is arranged to be variable in terms of angle and/or displacement distance from the injection conduit outlet for alteration in predictable liquid fuel atomisation and/or entrainment.

* * * * *